United States Patent [19]

Kootsouradis

[11] Patent Number: 5,613,594
[45] Date of Patent: Mar. 25, 1997

[54] CONVEYOR BELT TREATMENT APPARATUS

[75] Inventor: Anthony Kootsouradis, Amherst, Ohio

[73] Assignee: Stein, Inc., Sandusky, Ohio

[21] Appl. No.: 513,422

[22] Filed: Aug. 10, 1995

[51] Int. Cl.⁶ .................................................. B65G 45/22
[52] U.S. Cl. .......................... 198/495; 198/496; 15/256.5
[58] Field of Search ............................ 198/495, 496, 198/497, 498; 15/256, 256.5, 256.6

[56] References Cited

U.S. PATENT DOCUMENTS

| 3,116,811 | 4/1961 | Stevenson | 187/17 |
| 4,425,381 | 1/1984 | Walsh | 427/181 |

*Primary Examiner*—William E. Terrell
*Assistant Examiner*—Richard A. Chandler
*Attorney, Agent, or Firm*—Oldham & Oldham Co., LPA

[57] ABSTRACT

The present invention relates to an apparatus and a method for treating a conveyor belt with a treatment fluid while minimizing the amount of over spray of the treatment fluid into the air and onto the surrounding equipment and materials. For example, a pervious conveyor belt used in the cooking or other processing of food may be washed, scrubbed, or rinsed with water or a mixture of soap and water without causing overspray of the cleaning or rinsing fluid. Also, the apparatus and method may be used to spray a high quality non-stick coating onto the pervious conveyor belt without over spray of the non-stick coating onto surrounding plant equipment and materials. Overspray is minimized by the placement of treatment fluid flow diverters at the conveyor belt entrance and exit to divert the flow of treatment fluid away from the entrance and exit. The direction of flow of the treatment fluid is away from the entrance and exit so that the fluid does not exit the treatment chamber 30 through the conveyor belt entrance and exit. Rotatable brushes may be provided within the fluid treatment chamber 30 of the apparatus to facilitate the cleaning of the conveyor belt. The conveyor belt entrance, exit, and treatment chamber 30 may be shaped to accommodate the passage of a self-stacking conveyor belt.

18 Claims, 4 Drawing Sheets

CONVEYOR BELT TREATMENT APPARATUS

FIELD OF THE INVENTION

The present invention relates generally to a conveyor belt treatment apparatus for treating a conveyor belt with a treatment fluid and more particularly to an apparatus designed to wash, scrub, rinse, or coat a continuously moving, endless conveyor belt, such as that used in processing equipment with any desired treatment fluid.

BACKGROUND OF THE INVENTION

In the commercial preparation of food, it is common to use a conveyor belt system to efficiently move the food along a particular predefined path for a variety of purposes. For example, large scale food processing systems may use ovens, breaders, fryers or other processing machinery having an endless conveyor belt on which food products are positioned to pass through the processing machiner. It is an unavoidable consequence of a cooking, frying, breading or other food processing operation that the conveyor belt becomes coated with food residue. These food deposits are generally undesirable in that they may interfere with the flexibility of the conveyor belt, may burn and cause smoke within a cooking oven or fryer, or may become stuck to or impart an undesirable flavor to the food being processed. Also, if not removed from the conveyor belt, the food residue may become cooked onto the conveyor belt thereby becoming very difficult to remove without shutting the oven down.

Various methods of cleaning an endless conveyor belt in such equipment have been developed. It is generally known for example, to pass the conveyor belt through a reservoir containing a washing solution in an attempt to clean the food residue therefrom. It has been found effective to spray the moving conveyor belt with one or more high pressure streams of a cleaning fluid such as water or a mixture of soap and water. Although more effective in cleaning the conveyor belt, such high pressure spray cleaning results in a large amount of over spray of cleaning fluid into the processing plant and onto surrounding equipment or materials. In certain applications, the large amount of over spray produced by such pressurized fluid belt washers may be of no consequence, but still provides a relatively inefficient method of cleaning the belt. However, in other environments, such as in food processing environments the over spray of the cleaning fluid is highly undesirable due to strict regulations imposed on food processors, which may require that any cleaning operation be done separately from the food processing operations. Additionally, in the baking of breads and the like, over spray creates high humidity in the baking plant that can cause flour to clump or mold.

Another problem associated with the commercial cooking of food products is the waste of food products caused when a product or portion thereof cooked or otherwise processed becomes stuck to the conveyor belt. Product sticking to the belt also requires cleaning as described above. Currently, coating of the conveyor belt with a non-stick type compound, such as a two percent solution of Lesathin in water, by dipping the belt through a dip tank or bath of the non-stick coating solution. These coating systems for dipping the conveyor belt result in a large amount of wasted coating solution through spillage and leakage. In addition to spillage and leakage, the belt picks up an excessive amount of the non-stick coating which may drip onto the surrounding area when the belt leaves the bath. This waste of non-stick coating encourages the use of less expensive, highly diluted, non-stick solutions which are not as effective as more expensive or concentrated non-stick compounds. The technique of dipping a belt into a solution also cannot uniformly and accurately coat the belt with a predetermined coating thickness with such release agents or non-stick type of materials. There has therefore been found a need for an apparatus or method that allows for the cost effective application of the more effective, higher quality non-stick coatings.

SUMMARY OF THE INVENTION

The present invention is therefore directed to a belt treatment apparatus for treating a conveyor belt with a treatment fluid, the apparatus comprising a housing defining an at least substantially enclosed treatment chamber including a conveyor belt entrance and exit. Within the treatment chamber, at least one flow diverter is disposed in the region of the conveyor belt entrance and exit to divert the flow of the treatment fluid within the chamber away from the conveyor belt entrance and exit. The treatment apparatus also includes at least one spray nozzle for directing the treatment fluid onto a portion of the conveyor belt while the conveyor belt is within the treatment chamber.

The present invention is also directed to a method of treating a continuously moving conveyor belt with a treatment fluid. The method comprises the steps of providing a housing defining an at least substantially enclosed treatment chamber including a conveyor belt entrance, a conveyor belt exit, and at least one treatment fluid spray nozzle disposed to inject treatment fluid into the housing. The treatment fluid from the spray nozzle is directed onto a portion of said conveyor belt. The method further includes the step of establishing a predetermined flow of treatment fluid within said treatment chamber, such that said flow of treatment fluid within said treatment chamber is at least substantially away from both the belt entrance and the belt exit.

It is one object of the present invention to allow the treatment of a conveyor belt with a fluid while inhibiting over spray into the surrounding environment.

DETAILED DESCRIPTION OF THE PREFERRED EMBODIMENT

Figure 1:
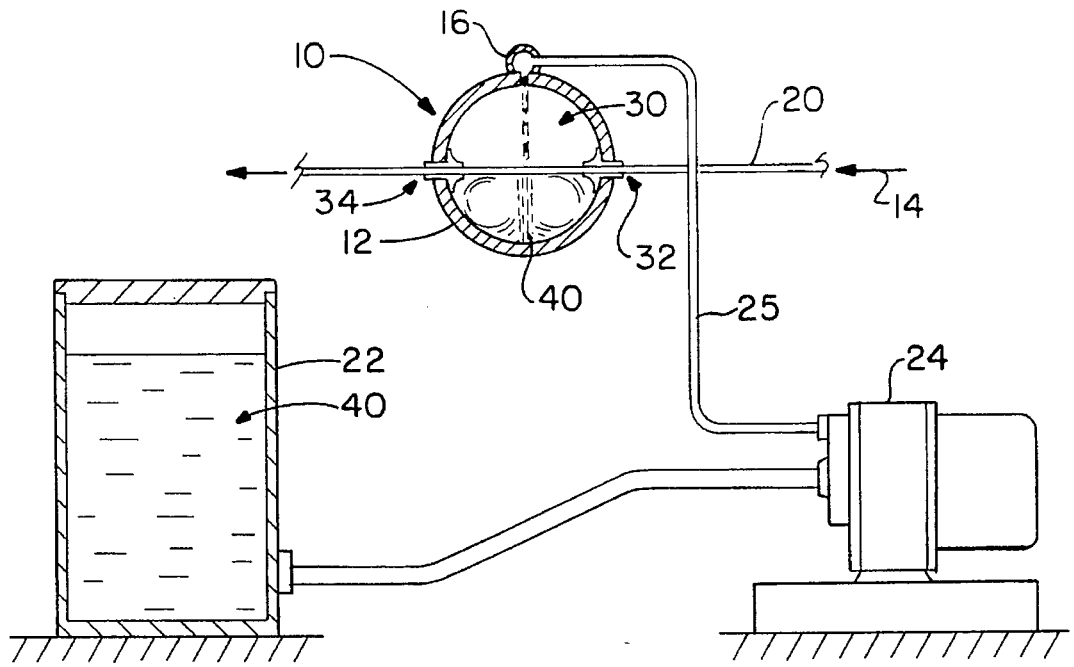
FIG. 1 is a schematic view of a belt treatment system employing the present invention.

Reference will now be made in detail to the present preferred embodiments of the invention, examples of which are illustrated in the accompanying drawings. Wherever possible, the same reference numerals will be used throughout the drawings to refer to the same or like parts.

Referring to FIG. 1, there is shown a belt treatment system according to the invention including a belt treatment apparatus shown generally at 10. The shown belt treatment system may be provided in association with equipment that uses an endless conveyor belt 20, such as a commercial food cooking oven or other commercial food processing system. The apparatus 10 may also be used with other equipment utilizing an endless conveyor belt 20 which must be cleaned or otherwise treated. In general, belt treatment apparatus 10 is designed to provide an apparatus for treating a pervious conveyor belt 20 with any desired liquid or fluid (shown in phantom at 40) without allowing over spray of the treatment fluid 40 into the surrounding environment. The treatment fluid 40 may be any fluid that is used to coat, clean, or otherwise treat a conveyor belt 20. For example, the treatment fluid 40 may be water, a mixture of a cleaning compound and water, a caustic cleaner, or a non-stick coating or release agent to prevent materials from sticking to the conveyor belt 20.

In the preferred embodiment, belt treatment apparatus 10 comprises a substantially hollow housing 12 preferably formed as an elongated cylinder to define a conveyor belt treatment chamber 30 within hollow housing 12. Belt treatment apparatus 10 is designed to treat conveyor belt 20 with treatment fluid 40 as belt 20 moves on a path in the direction indicated by arrow 14. Belt 20 passes into belt treatment chamber 30 through a conveyor belt entrance 32 formed through housing 12 and exits treatment chamber 30 through conveyor belt exit 34 formed through housing 12.

If belt treatment apparatus 10 is to be used as a belt washing apparatus in food processing equipment as is described in more detail below, the apparatus 10 is preferably placed just downstream from the area where food is unloaded from the conveyor belt. Alternatively, if belt treatment apparatus is to be used to apply a non-stick coating, it is thought preferable to position belt treatment apparatus just upstream from the area where food is placed onto the conveyor belt. As may be seen in FIG. 7, and is described in more detail below, a series of different belt treatment apparatus 10, 110, 210, 310 may be provided to treat belt 20 with any series of belt treatment fluids 40 as may be desired.

Referring again to FIG. 1, a treatment fluid reservoir 22 is provided to contain a supply of treatment fluid 40 and is in fluid communication with a pump 24 so that pump 24 may provide a pressurized source of treatment fluid 40 through a suitable pipe or hose 25 to a manifold 16 which includes one or more spray nozzles 19 to spray treatment fluid 40 onto belt 20 within treatment chamber 30. The treatment solution 40 may also be heated or otherwise treated before being pumped to the belt treatment apparatus 10. For use as a cleaning apparatus, the treatment fluid 40 may be supplied under high pressure to impinge upon the surfaces of the belt 20 with a force which will effectively clean the belt without scrubbing or otherwise abrasively scraping the belt.

Figure 3:
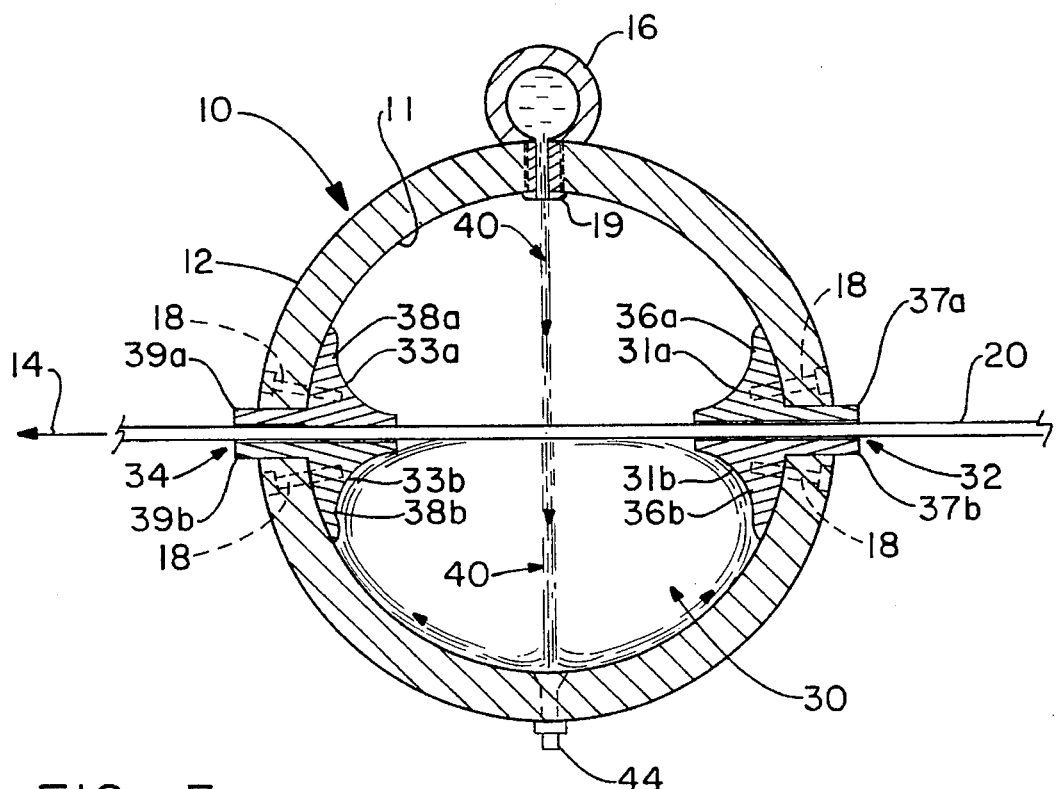
FIG. 3 is a cross-sectional view of the embodiment of FIG. 2, taken along line 3—3 of FIG. 2.
Figure 2:
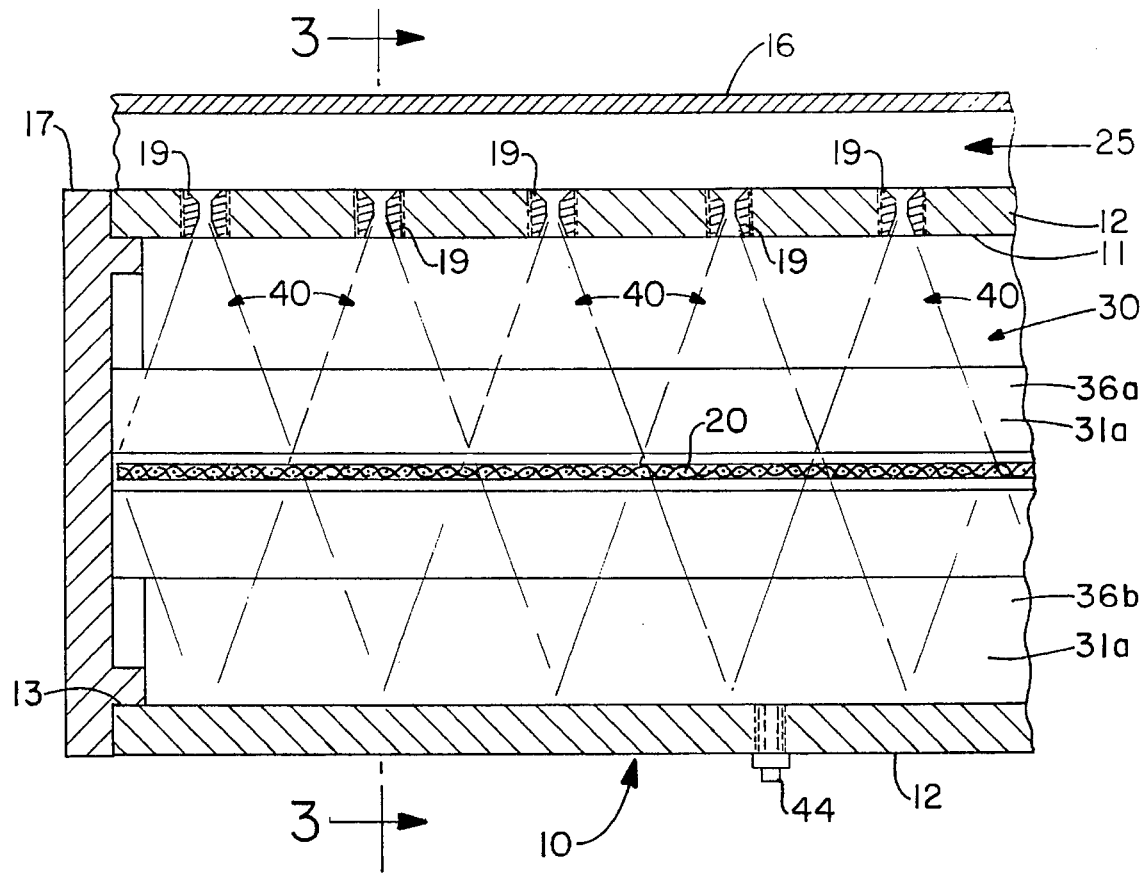
FIG. 2 is a perspective view of a first embodiment of the present invention.

As may be seen more clearly in FIGS. 2 and 3, belt treatment apparatus 10 is made of an at least substantially hollow housing 12 preferably having an elongated cylindrical shape to define a substantially closed treatment chamber 30. Housing 12 may be formed in one or more pieces, and preferably has open ends 13, 15 onto which a end caps 17 may be tightly fitted and secured with a clamp or other suitable means. Removal of end caps 17 allows easy access to treatment chamber 30 as may be required for inspection, cleaning or other maintenance within treatment chamber 30.

A spray manifold 16 is provided in the preferred embodiment, and includes at least one and preferably a plurality of spray nozzles 19 disposed along the length thereof as may be seen in FIG. 2. Manifold 16 is connected to hose 25 to receive a pressurized supply of treatment fluid 40 from pump 24. Manifold 16 may be mounted to the exterior surface of housing 12 such that nozzles 19 are provided access to treatment chamber 30 through holes or a slot formed in housing 12. Gaskets or other suitable sealing mechanisms may be employed to prevent leakage of treatment fluid from treatment chamber 30 through any holes or slot formed to accept nozzles 19. Nozzles 19 are configured to direct a spray of treatment fluid 40 onto conveyor belt 20 as it passes through treatment chamber 30. The spray pattern and spray pressure of nozzles 19 may be adjusted as desired depending upon the particular belt treating operation being performed by belt treatment apparatus 10. For example, if belt treatment apparatus 10 is being used to pressure wash conveyor belt 20, a high pressure spray of treatment fluid 40 may be used to provide cleaning action of spray 40 upon belt 20. However, if belt treatment apparatus is being used to simply rinse a previously applied cleaning solution from belt 20, a lower spray pressure of treatment fluid 40 may be utilized. Housing 12 also includes one or more drains 44 for collecting and draining treatment fluid 40 introduced into treatment chamber 30 through nozzles 19. Housing 12 may be configured such that a portion of inner surface 11 of housing 12 is sloped toward the one or more provided drains 44 to encourage the flow of excess treatment fluid 40 into the drains 44. Manifold 16 as shown in FIGS. 1–3, is positioned and directly at the top of housing 12 to establish the preferred flow of treatment fluid 40 within treatment chamber 30 as is described in more detail below. However, those skilled in the art will recognize that manifold 16 may be provided at other suitable locations. For example, as is seen in the alternate embodiment of FIG. 4, manifold 16 and nozzles 19 associated therewith may be provided entirely within treatment chamber 30. Further, more than one manifold 16 may be utilized to direct the treatment fluid against belt 20 from a plurality of different directions or locations.

Housing 12 includes a belt entrance 32 through which a belt 20 may enter treatment chamber 30, and a belt exit 34 through which belt 20 may exit treatment chamber 30. Belt entrance 32 includes at least one and preferably two conveyor belt entrance flow diverters 36a, 36b disposed on interior surface 11 of housing 12 on opposite sides of belt entrance 32 as close together as possible without interfering with passage of belt 20 through conveyor belt entrance 32. The belt entrance 32 is made as small as possible to substantially prevent overspray of treatment fluid 40 from treatment chamber 30. The belt entrance flow diverters 36a, 36b also preferably include belt entrance guide members 37a, 37b, respectively, that extend at least partially into belt entrance 32 from within treatment chamber 30 to guide belt 20 through belt entrance 32 to prevent damage to belt 20 and housing 12 that may be caused if moving belt 20 is allowed to contact housing 12. Similarly, belt exit 34 includes at least one and preferably two conveyor belt exit flow diverters 38a, 38b disposed on interior surface 11 of housing 12 on opposite sides of belt exit 34 as close together as possible without interfering with passage of belt 20 through conveyor belt exit 34. Belt exit 34 is also made as small as possible to limit overspray of treatment fluid 40 from treatment chamber 30. Also similar to the belt entrance, belt exit flow diverters 38a, 38b preferably include belt exit guide members 39a, 39b respectively, that extend at least partially into belt exit 34 from within treatment chamber 30 to guide belt 20 through belt exit 34 to prevent damage to belt 20 and housing 12. Belt entrance guide members 37a, 37b are preferably formed in a one-piece construction along with belt entrance flow diverters 36a, 36b respectively. Similarly belt exit guide members 39a, 39b are preferably formed in a one-piece construction with belt exit flow diverters 38a, 38b respectively. As show in FIG. 3, each of the one-piece units forming the flow diverters and guide members may be similar, with upper and lower units simply rotated or flipped around for use.

As may be seen most clearly in FIG. 3, belt entrance flow diverters 36a, 36b respectively include an inner surface 31a, 31b that is curved in such a manner that any treatment fluid 40 sprayed from nozzles 19 of manifold 16 into treatment chamber 30 and flowing toward conveyor belt entrance 32 is diverted away from conveyor belt entrance 32. It can be seen in FIG. 3 that any treatment fluid 40 traveling along inner surface 11 of housing 12 toward conveyor belt entrance 32 is diverted by curved surface 31b of entrance flow diverter 36b in a direction that corresponds to the direction of travel of belt 20 as is shown by arrow 14. Similarly, belt exit flow diverters 38a, 38b, respectively include a curved inner surfaces 33a, 33b that are curved in such a manner that any treatment fluid 40 sprayed from nozzles 19 of manifold 16 into treatment chamber 30 and flowing toward conveyor belt exit 34 is diverted away from conveyor belt exit 34. As is shown in FIG. 3, any treatment fluid traveling along inner surface 11 of housing 12 toward conveyor belt exit 34 is diverted by curved surface 33b of exit flow diverter 38b in a direction opposite the direction in which belt 20 is traveling.

As mentioned, belt entrance guide members 37a, 37b are preferably formed as a one-piece construction with belt entrance flow diverters 36a, 36b respectively and belt exit guide members 39a, 39b are preferably formed as a one-piece construction with belt exit flow diverters 38a, 38b respectively. Flow diverters 36a, 36b, 38a, 38b respectively including guide members 37a, 37b, 39a, 39b formed as a part thereof may be formed of a thermoplastic material such as high density polyethylene or polypropylene, or any other suitable low friction material that will allow conveyor belt 20 to ride smoothly thereon and which is sufficiently durable to withstand abrasion caused by the conveyor belt 20. Such materials are also easy to clean and facilitate compliance with any health standards such as in food processing environments. Flow diverters 36a, 36b and 38a, 38b are each secured to inner surface 11 of housing 12 by bolts 18 or other suitable fasteners.

In operation, treatment fluid is supplied from reservoir 22 to manifold 16 under pressure from pump 24. As may be seen in FIG. 3, treatment fluid 40 is sprayed from nozzles 19 under pressure and is directed toward belt 20 to clean, coat or otherwise treat the belt 20. Because belt 20 is preferably pervious, a substantial amount of treatment fluid 40 flows through belt and contacts inner surface 11 of housing 12 at a point opposite nozzles 19. Because of the cylindrical shape of housing 12, treatment fluid 40 is deflected along inner surface 11 and toward both conveyor belt entrance 32 and conveyor belt exit 34 as is shown in FIG. 3. However, fluid 40 flowing toward belt entrance 32 is diverted by curved surface 31b of belt entrance flow diverter 36b away from belt entrance 32. Likewise, fluid 40 flowing toward belt exit 34 is diverted by curved surface 33b of belt exit flow diverter 38b away from belt exit 32. Similarly, if manifold 16 was located at a position below belt 20, such as opposite to that shown, flow diverters 36a, 38a would act in a manner similar to that described above with respect to diverters 36b, 38b. Flow diverters 36a, 38a also divert any fluid migrating to the top portion of housing 12 away from the entrance and exit. Continuous spray of treatment fluid 40 by nozzles 19 creates a relatively constant flow of treatment fluid 40 as is described above and shown in FIG. 3, which functions to inhibit the exit of treatment fluid from belt entrance 32 and belt exit 34. The flow diverters also create turbulence in the flow of the treatment fluid 40 which facilitates effective cleaning or coating of the belt surfaces.

Belt treatment apparatus 10 may be used to impinge belt 20 with a high pressure spray of a treatment fluid 40 such as water, a mixture of soap and water, a caustic cleaning agent or other desired treatment fluid. In conjunction with such an application, spray nozzles 19 are preferably adjusted to impinge belt 20 with a direct or focused stream of treatment fluid 40 so that the force of fluid 40 upon belt 20 acts to effectively clean food residue from belt 20. In other applications, such as when belt treatment apparatus is being used to coat a belt 20 with a treatment fluid 40 such as a non-stick coating, the nozzles 19 may be configured to atomize the non-stick fluid 40 into extremely small airborne particles. In this manner, belt 20 may be coated with only the required thin coating of non-stick treatment fluid 40, allowing for the more efficient use of higher quality and more expensive non-stick coatings.

Figure 4:
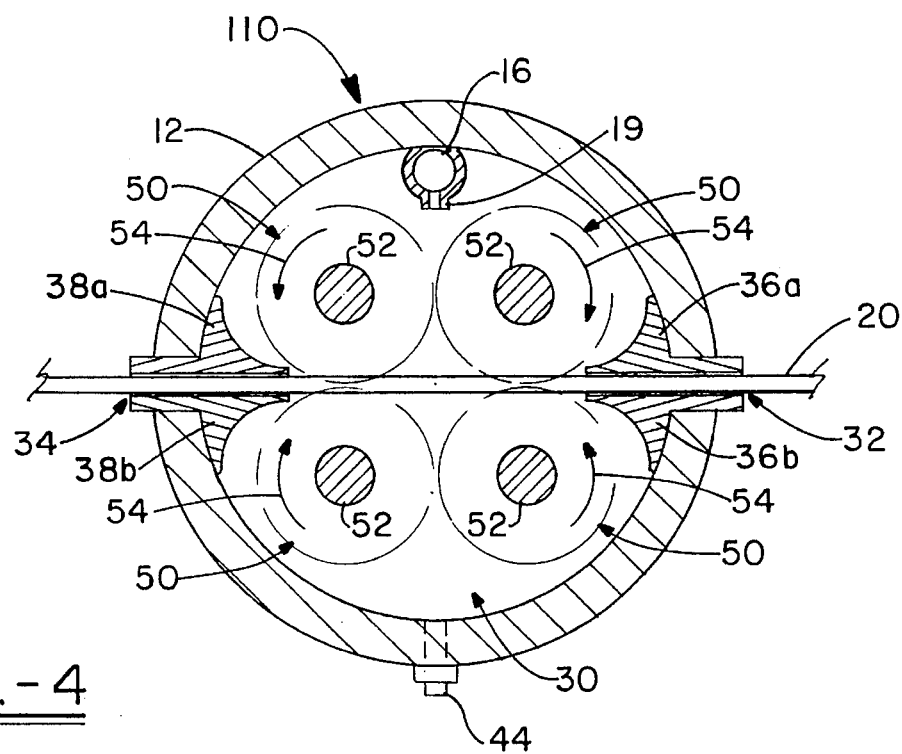
FIG. 4 is a cross-sectional view of an alternative embodiment of the present invention.

An alternative embodiment of the present invention is shown at 110 in FIG. 4 wherein one or more rotating brushes 50 are provided within treatment chamber 30 to rotate and provide a scrubbing action upon belt 20 to facilitate the removal of food deposits therefrom. Brushes 50 are mounted to extend across at least a portion of upper and/or lower surface of belt 20. Brushes 50 include shafts 52 extending therethrough which are mounted in bearings (not shown) located at ends 13, 15 of housing 12. Brushes 50 may be rotated by a wide variety of driving means. For example, a drive motor (not shown) may be provided to rotate brushes 50 through gears, belts, or chains connected to shafts 52 of brushes 50. Also, brushes 50 may be rotated at different speeds relative to each other to provide an improved scrubbing action upon belt 20. It is thought preferable to rotate the various brushes 50 in the directions as is shown in relation to each by the arrows 54 so that they rotate in a manner to discourage the flow of treatment fluid 40 toward the belt entrance 32 and belt exit 34.

Figure 5:
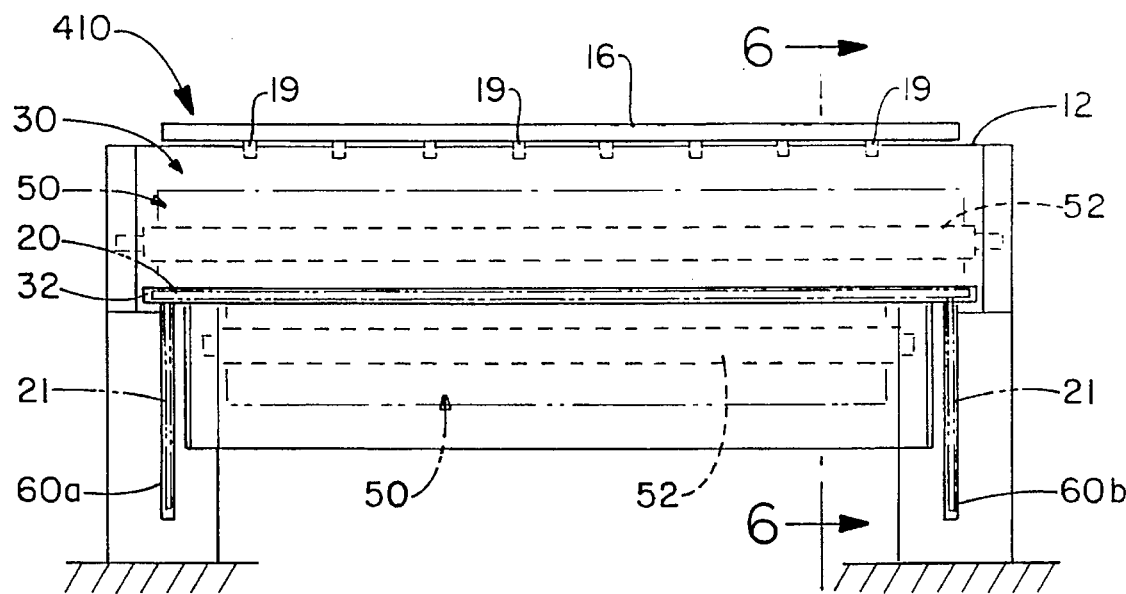
FIG. 5 is a front elevational view of an alternative embodiment of the present invention.
Figure 6:
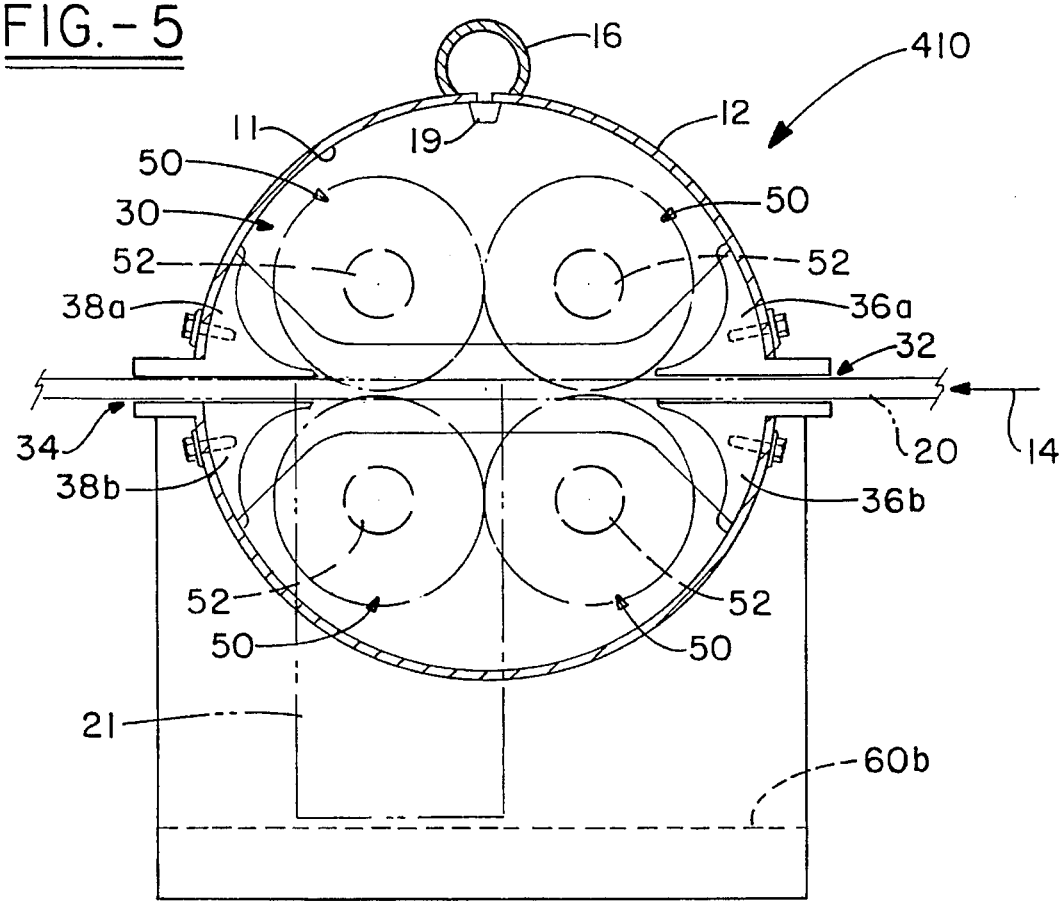
FIG. 6 is a cross-sectional view of the embodiment shown in FIG. 5, taken along line 6—6 of FIG. 5; and of the present invention.

Another alternative embodiment of the present invention is shown in FIGS. 5 and 6 wherein the belt treatment apparatus of the present invention is shown generally at 410. Belt treatment apparatus 410 is similar to the belt treatment apparatus 10, 110, 210, 310 discussed above, except it is designed to accommodate the passage of a self-stacking pervious conveyor belt 20 therethrough. For example, a self-stacking conveyor belt is shown in U.S. Pat. No. 4,603,776, and is produced by Frigoscandia Food Process Systems AB of Helsinborg, Sweden. Self-stacking belts typically have rigid side members 21 provided on the edges of the conveyor belt and extending from the sides thereof. Belt treatment apparatus 410 includes a housing 12, belt entrance 32 and belt exit 34 that have been modified to allow for the passage of side members 21 through the apparatus 410. Specifically, passageways 60a, 60b have been added to belt treatment apparatus housing 12. Although not required, additional seals may be provided in association with passageways 60a, 60b to prevent the exit of any treatment fluid 40 therefrom. In such an embodiment, brushes 50 may again also optionally be provided and may include side bristles to act upon side members 21 of belt 20.

Figure 7:
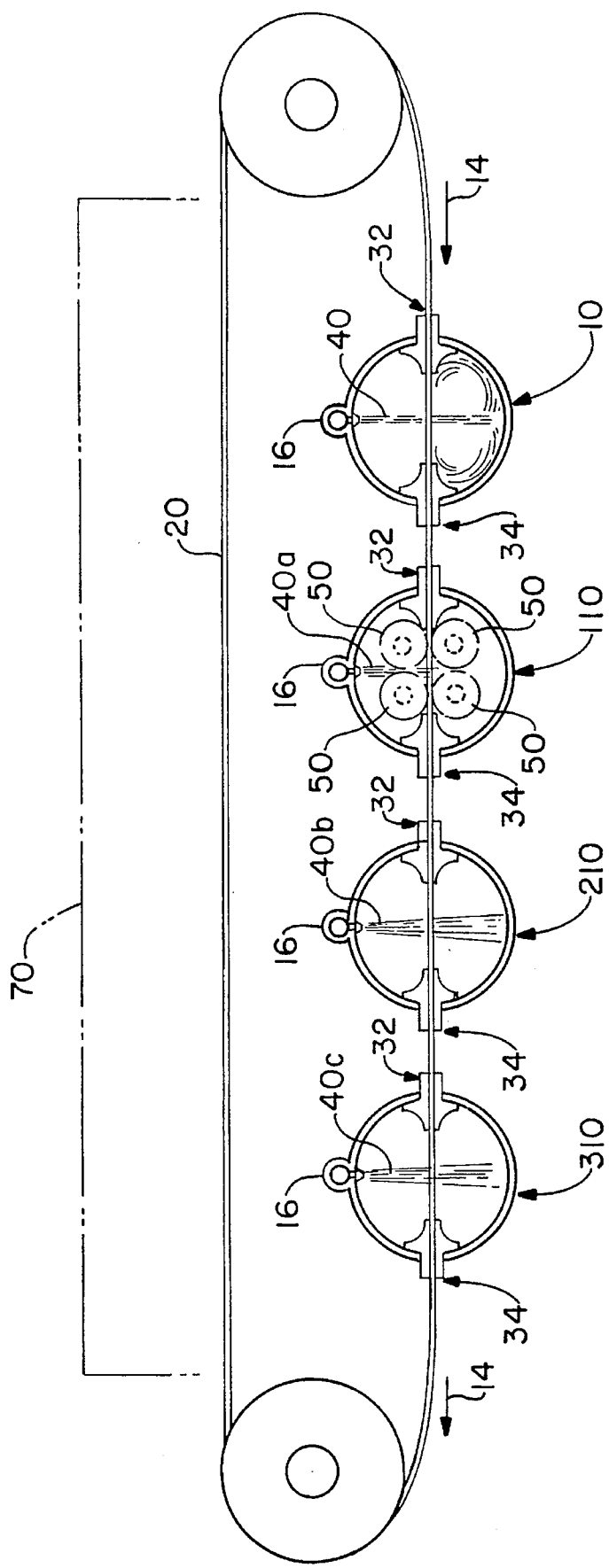
FIG. 7 is a schematic view of a food processing system including a plurality of belt treatment apparatus in accordance with the invention.

As is shown in FIG. 7, a plurality of belt treatment apparatus 10, 110, 210, 310 may be provided in association with processing equipment 70 or as part of a processing line to perform a series of belt treatments. For example, belt treatment apparatus 10 may be designed to impinge pervious conveyor belt 20 with a high pressure spray of a caustic cleaning treatment fluid 40. The caustic treatment fluid 40 acts to dissolve food residue from conveyor belt 20. Belt 20 may then next pass to treatment apparatus 110 which includes rotating brushes 50 and uses a high pressure spray of a treatment fluid 40 a such as mixture of soap and water to scrub belt 20 to remove food residue therefrom. Belt 20 next travels to a belt treatment apparatus 210 designed to rinse belt 20 of soap, caustic treatment fluid, and food residue. Apparatus 210 may dispense a rinse treatment fluid such as water from manifold 16 at a lower pressure than cleaning treatment fluid 40 of apparatus 110. Finally, belt 20 may pass into a belt treatment apparatus 310 designed to coat belt 20 with a non-stick treatment fluid 40. To fully atomize the non-stick coating treatment fluid 40c, a suitable nozzle may be used or a very high pressure spray may be utilized. It can be seen in all of the belt treatment apparatus 10, 110, 210, 310 that entrance flow diverters 36a, 36b and exit flow diverters 38a, 38b act to establish a flow of treatment fluid 40b within each treatment chamber 30 that inhibits the flow of treatment fluid 40 out of the belt entrance 32 or exit 34 and more effectively distributes treatment fluid 40c around the belt 20 to clean, coat or otherwise treat the belt as desired.

While the foregoing description has set forth the preferred embodiment of the invention in particular detail, it must be understood that numerous modifications, substitutions, and changes may be undertaken without departing from the true spirit and scope of the present invention as defined by the ensuing claims.

What is claimed is:

1. A belt treatment apparatus for treating a conveyor belt with a treatment fluid, the apparatus comprising:
   a housing defining an at least substantially enclosed treatment chamber including a conveyor belt entrance and a conveyor belt exit;
   at least one entrance flow diverter disposed at least substantially within said treatment chamber and connected to said housing in the region of said conveyor belt entrance to divert the flow of the treatment fluid within said treatment chamber away from said conveyor belt entrance;
   at least one exit flow diverter disposed at least substantially within said treatment chamber and connected to said housing in the region of said conveyor belt exit to divert the flow of treatment fluid within said treatment chamber away from said conveyor belt exit; and,
   at least one spray nozzle for directing said treatment fluid onto a portion of said conveyor belt while at least a portion of said conveyor belt is within said treatment chamber.

2. An apparatus as recited in claim 1, wherein said housing is provided as a substantially hollow elongated cylinder.

3. An apparatus as recited in claim 1, wherein said at least one entrance flow diverter includes a curved inner surface to divert said treatment fluid away from said conveyor belt entrance when said treatment fluid contacts said curved inner surface of said at lest one entrance flow diverter.

4. An apparatus as recited in claim 1, wherein said at least one exit flow diverter includes a curved inner surface to divert said treatment fluid away from said conveyor belt exit when said treatment fluid contacts said curved inner surface of said at least one exit flow diverter.

5. An apparatus as recited in claim 1, wherein said at least one spray nozzle is provided as a part of a manifold, said manifold provided exterior to said housing such that said at least one spray nozzle is provided access into said treatment chamber through a hole formed in said housing.

6. An apparatus as recited in claim 1, wherein said at least one spray nozzle is provided as a part of a manifold, wherein said manifold is disposed at least substantially within said treatment chamber.

7. An apparatus as recited in claim 1, further comprising at least one rotatable brush provided within said treatment chamber to act upon said conveyor belt to remove residue therefrom.

8. An apparatus as recited in claim 1, further comprising at least one drain formed through said housing to collect and drain treatment fluid from said treatment chamber.

9. An apparatus as recited in claim 1, wherein said housing, said conveyor belt entrance, and said conveyor belt exit are designed to allow for the passage of a self-stacking conveyor belt including rigid side members.

10. An apparatus as recited in claim 9, further comprising at least one rotatable brush provided within said treatment chamber to act upon said conveyor belt to remove residue therefrom.

11. An apparatus as recited in claim 1, wherein said treatment fluid is a cleaning fluid which is directed onto said conveyor belt for cleaning thereof.

12. An apparatus as recited in claim 1, wherein said treatment fluid is a non-stick coating agent which is directed onto said conveyor belt for coating of at least certain surfaces thereof.

13. An apparatus as recited in claim 12, wherein said coating agent is directed into said treatment chamber in an atomized state.

14. A method of treating a continuously moving conveyor belt with a treatment fluid, the method comprising the steps of:
   providing a housing defining an at least substantially enclosed treatment chamber including a conveyor belt entrance, a conveyor belt exit, and at least one spray nozzle; directing a flow of treatment fluid onto said conveyor belt from said at least one spray nozzle; and,
   establishing a flow of treatment fluid within said treatment chamber such that said flow of treatment fluid within said treatment chamber is at least substantially away from both said belt entrance and said belt exit.

15. A method of treating a conveyor belt as recited in claim 14, wherein said treatment fluid is a conveyor belt washing solution and said step of directing a flow of treatment fluid onto said conveyor belt is accomplished by directing a high pressure stream of said treatment fluid onto said conveyor belt.

16. A method as recited in claim 14, wherein said treatment fluid is a non-stick coating, and said step of directing a flow of treatment fluid onto said conveyor belt is accomplished by atomizing said treatment fluid using said at least one spray nozzle.

17. A method of treating a conveyor belt as recited in claim 14, wherein said housing further comprises at least one rotatable brush supported therein, and said method further comprises the step of contacting said conveyor belt with said at least one rotatable brush such that said brush acts to scrub food residue form said conveyor belt.

18. A method as recited in claim 14, further comprising the step of providing at least two of said housings fix treatment of said conveyor belt, wherein said treatment chambers defined by each of said housings are used to treat said conveyor belt with differing treatment fluids.

\* \* \* \* \*